(12) United States Patent
Li et al.

(10) Patent No.: US 10,912,123 B2
(45) Date of Patent: Feb. 2, 2021

(54) METHOD FOR TRANSMITTING UPLINK DATA, USER EQUIPMENT AND NETWORK-SIDE DEVICE

(71) Applicant: VIVO MOBILE COMMUNICATION CO., LTD., DongGuan (CN)

(72) Inventors: Xiaolong Li, DongGuan (CN); Chenlu Zhang, DongGuan (CN); Fei Qin, DongGuan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 16/349,335

(22) PCT Filed: Nov. 8, 2017

(86) PCT No.: PCT/CN2017/109950
§ 371 (c)(1),
(2) Date: May 13, 2019

(87) PCT Pub. No.: WO2018/086535
PCT Pub. Date: May 17, 2018

(65) Prior Publication Data
US 2019/0335505 A1 Oct. 31, 2019

(30) Foreign Application Priority Data
Nov. 14, 2016 (CN) .......................... 2016 1 1029734

(51) Int. Cl.
*H04W 74/08* (2009.01)
*H04W 76/11* (2018.01)
(Continued)

(52) U.S. Cl.
CPC ....... *H04W 74/0833* (2013.01); *H04L 5/0055* (2013.01); *H04W 72/1268* (2013.01);
(Continued)

(58) Field of Classification Search
CPC ............. H04W 74/0833; H04W 76/11; H04W 72/1268; H04W 72/14; H04W 80/02; H04L 5/0055
(Continued)

(56) References Cited

U.S. PATENT DOCUMENTS

2014/0192767 A1 7/2014 Au et al.
2014/0254544 A1 9/2014 Kar Kin Au et al.
(Continued)

FOREIGN PATENT DOCUMENTS

CN 101489258 A 7/2009
CN 101873713 A 10/2010
(Continued)

OTHER PUBLICATIONS

PCT/CN2017/109950—Extended European Search Report, dated Sep. 18, 2019, 9 pages.
(Continued)

*Primary Examiner* — Obaidul Huq
(74) *Attorney, Agent, or Firm* — Getech Law LLC; Jun Ye (57) ABSTRACT

A method for transmitting uplink data, a user equipment and a network-side device are provided according to the present disclosure. The method for transmitting uplink data includes: transmitting a first message to a network-side device; receiving a second message fed back by the network-side device, where the second message is determined by the network-side device based on information about the network-side device and the first message; and transmitting the uplink data in an uplink data transmission manner corresponding to the second message. In solutions of the present disclosure, the user equipment can flexibly transmit uplink data in response to an instruction from a network-side device without being limited to transmitting the uplink data
(Continued)

in an uplink scheduling grant-based manner, thereby achieving the objectives of fulfilling service requirements and transmitting uplink data with high flexibility and stability.

16 Claims, 7 Drawing Sheets

(51) Int. Cl.
 *H04L 5/00* (2006.01)
 *H04W 72/12* (2009.01)
 *H04W 72/14* (2009.01)
 *H04W 80/02* (2009.01)
(52) U.S. Cl.
 CPC ............ *H04W 72/14* (2013.01); *H04W 76/11* (2018.02); *H04W 80/02* (2013.01)
(58) Field of Classification Search
 USPC .......................................... 370/10, 328, 329
 See application file for complete search history.

(56) References Cited

U.S. PATENT DOCUMENTS

| | | | | |
|---|---|---|---|---|
| 2016/0029349 | A1* | 1/2016 | Vargantwar | H04W 74/006 370/329 |
| 2016/0302076 | A1 | 10/2016 | Chou et al. | |
| 2016/0338107 | A1 | 11/2016 | Zeng et al. | |
| 2016/0353453 | A1* | 12/2016 | Au | H04W 74/006 |
| 2017/0034845 | A1 | 2/2017 | Liu et al. | |
| 2018/0027493 | A1 | 1/2018 | Li et al. | |
| 2018/0092125 | A1* | 3/2018 | Sun | H04W 74/02 |
| 2018/0139778 | A1* | 5/2018 | Chou | H04W 76/27 |

FOREIGN PATENT DOCUMENTS

| | | |
|---|---|---|
| CN | 104838713 A | 8/2015 |
| CN | 105284172 A | 1/2016 |
| CN | 105992373 A | 10/2016 |
| CN | 106060937 A | 10/2016 |
| CN | 107736049 A | 2/2018 |
| CN | 107852722 A | 3/2018 |
| WO | 2012150883 A1 | 11/2012 |
| WO | 2014092616 A1 | 6/2014 |
| WO | 2015113252 A1 | 8/2015 |
| WO | 2016163642 A1 | 10/2016 |

OTHER PUBLICATIONS

Nokia, Alcatel-Lucent Shanghai Bell, Grant-Free to Grant-Based Switching for URLLC, Nov. 14-18, 2016, 3 pages.
PCT/CN2017/109950—International Preliminary Report, dated May 23, 2019, 6 pages.
Ericsson, "Running MAC CR for LAA", May 25, 2016, 80 pages.
PCT/CN2017/109950—International Search Report and Written Opinion, dated Jan. 29, 2018, 11 pages. (no English abstract).
Application No. 201611029734.8—First Office Action, dated Jun. 4, 2019, 10 pages. (with translation).

* cited by examiner

METHOD FOR TRANSMITTING UPLINK DATA, USER EQUIPMENT AND NETWORK-SIDE DEVICE

CROSS-REFERENCE TO RELATED APPLICATIONS

This application is the U.S. national phase of PCT Application No. PCT/CN2017/109950 filed on Nov. 8, 2017, which claims a priority to Chinese Patent Application No. 201611029734.8 filed on Nov. 14, 2016, the disclosures of which are incorporated in its entirety by reference herein.

TECHNICAL FIELD

The present disclosure relates to the field of communication technology, in particular to a method for transmitting uplink data, a user equipment and a network-side device.

BACKGROUND

At present, in a long term evolution (Long Term Evolution, abbreviated as LTE) system, when transmitting uplink data, a user equipment (User Equipment, abbreviated as UE) only transmits the uplink data in uplink resources scheduled and granted in real time by a base station based on an uplink scheduling grant of the base station. That is, the UE needs to receive an uplink grant message from the base station before transmitting uplink data, and transmits the uplink data in uplink resources indicated by the uplink grant message. Thus, the UE can transmit the uplink data only after receiving the uplink grant message from the base station, which therefore results in high latency of data and large signaling overheads.

In order to reduce latency and signaling overheads, it is proposed that a UE can transmit uplink data in an uplink scheduling grant-free manner in a fifth generation (5-th Generation, abbreviated as 5G) mobile communication system, that is, the UE can transmit uplink data without an uplink grant message transmitted by a base station.

However, no specific method for indicating a UE to transmit uplink data in the uplink scheduling grant-free manner has been provided yet, and hence, a UE cannot flexibly select whether to transmit uplink data in an uplink scheduling grant-based manner or in an uplink scheduling grant-free manner, thereby failing to meet service requirements of the UE and give considerations into the status of air interface resource loads, and adversely affecting transmission efficiency and stability.

SUMMARY

A method for transmitting uplink data, a user equipment and a network-side device are provided according to embodiments of the present disclosure, to solve the problem that a UE cannot flexibly select whether to transmit uplink data in an uplink scheduling grant-based manner or in an uplink scheduling grant-free manner.

In an aspect, a method for transmitting uplink data is provided according to an embodiment of the present disclosure, which includes:
transmitting a first message to a network-side device;
receiving a second message fed back by the network-side device, where the second message is determined by the network-side device based on information about the network-side device and the first message; and
transmitting uplink data in an uplink data transmission manner corresponding to the second message.

In another aspect, a user equipment is further provided according to an embodiment of the present disclosure, which includes: a first bus, a first processor, a first transceiver, a first bus interface, a first memory, a computer program stored in the first memory and executable on the first processor, and a user interface, where:
the first processor is configured to perform steps of the above method for transmitting uplink data according to the present disclosure when executing the computer program; and
the first transceiver is configured to receive and transmit data under the control of the first processor.

In another aspect, a computer readable storage medium is further provided according to an embodiment of the present disclosure, where a computer program is stored in the computer readable storage medium and steps of the above method for transmitting uplink data according to the present disclosure are performed when the computer program is executed by the processor.

In another aspect, a method for transmitting uplink data is provided according to an embodiment of the present disclosure, which includes:
receiving a first message transmitted by a user equipment;
determining a second message based on information about a network-side device and the first message; and
transmitting the second message to the user equipment, where the second message is configured to indicate the user equipment to transmit uplink data in an uplink data transmission manner corresponding to the second message.

In another aspect, a network-side device is further provided according to an embodiment of the present disclosure, which includes: a second bus, a second transceiver, an antenna, a second bus interface, a second processor, a second memory, and a computer program stored in the second memory and executable on the second processor, where:
the second processor is configured to perform steps of the above method for transmitting uplink data according to the present disclosure when executing the computer program; and
the second transceiver is configured to receive and transmit data under the control of the second processor.

In another aspect, a computer readable storage medium is further provided according to an embodiment of the present disclosure, where a computer program is stored in the computer readable storage medium and steps of the above method for transmitting uplink data according to the present disclosure are performed when the computer program is executed by the processor.

In another aspect, a user equipment is further provided according to an embodiment of the present disclosure, which includes:
a first transmission module, configured to transmit a first message to a network-side device;
a first reception module, configured to receive a second message fed back by the network-side device, where the second message is determined by the network-side device based on information about the network-side device and the first message; and
a second transmission module, configured to transmit uplink data in an uplink data transmission manner corresponding to the second message.

In another aspect, a network-side device is further provided according to an embodiment of the present disclosure, which includes:

a third reception module, configured to receive a first message transmitted by a user equipment;

a determination module, configured to determine a second message based on information about the network-side device and the first message; and a third transmission module, configured to transmit the second message to the user equipment, where the second message is configured to indicate the user equipment to transmit uplink data in an uplink data transmission manner corresponding to the second message.

Accordingly, in the method for transmitting uplink data according to the embodiments of the present disclosure, a first message is transmitted to a network-side device, a second message fed back by the network-side device is received, where the second message is determined by the network-side device based on information about the network-side device and the first message, and uplink data is transmitted in an uplink data transmission manner corresponding to the second message. In this way, a user equipment can flexibly transmit uplink data in response to an instruction of a network-side device without being limited to transmitting the uplink data in an uplink scheduling grant-based manner, thereby achieving the objectives of fulfilling service requirements and transmitting uplink data with high flexibility and stability.

BRIEF DESCRIPTION OF THE DRAWINGS

In order to better clarify the technical solutions according to the embodiments of the present disclosure or in prior art, drawings to be used in the embodiments of the present disclosure are briefly described below. Apparently, the drawings described below only illustrate some drawings of the present disclosure, and other drawings may be obtained based on these drawings by those skilled in the art without inventive efforts.

DETAILED DESCRIPTION

In order to better clarify the technical solutions according to the embodiments of the present disclosure or in prior art, the drawings involved in the description of the embodiments of the present disclosure are briefly introduced hereinafter. Apparently, the drawings only illustrate some embodiments of the present disclosure, and other drawings may be obtained based on these drawings by those skilled in the art without inventive efforts.

Figure 1:
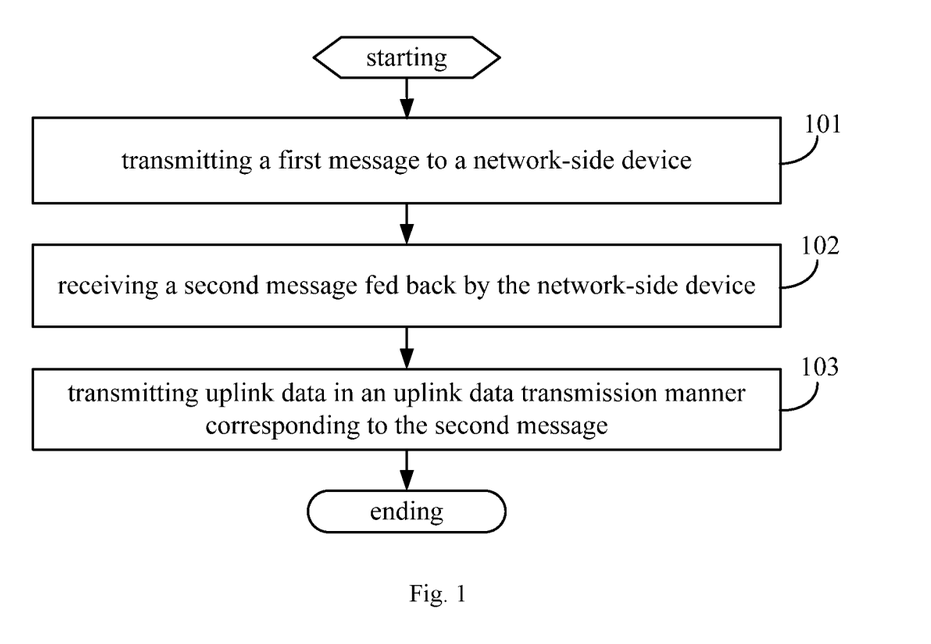
FIG. 1 is a flowchart of a method for transmitting uplink data according to some embodiments of the present disclosure.

With reference to FIG. 1, a method for transmitting uplink data is provided according to some embodiments of the present disclosure, which is applied to a UE in a mobile communications system such as 5G and includes steps 101 to 103 described in the following.

Step 101 includes: transmitting a first message to a network-side device.

In an embodiment of the present disclosure, the first message may be transmitted to a network-side device, when uplink data arrives at a UE and an uplink data transmission process is to be triggered. The first message is msg1 or a random access request message, for example, which is employed to notify the network-side device of an uplink data transmission manner desired by the UE. The network-side device may be, for example, a base station, which is not limited in the present disclosure.

Specifically, the first message may include identifier information, and the identifier information is for indicating the uplink data transmission manner desired by the UE. The identifier information may be set by the UE based on a user equipment capability, an uplink data transmission manner supported by the network-side device, and/or service information to be transmitted. The user equipment capability includes, but not limited to, whether the UE supports transmitting uplink data in an uplink scheduling grant-free manner For example, in a case that the UE and the network-side device both support transmitting uplink data in a grant-free uplink resource and the amount of service data is large, the UE may incorporate the identifier information into msg1 to be transmitted to the network-side device, where the identifier information indicates that the UE desires to transmit uplink data in an uplink scheduling grant-free manner.

Step 102 includes: receiving a second message fed back by the network-side device.

In an embodiment of the present disclosure, after receiving the first message transmitted by the UE, the network-side device may feed back a second message to the UE. The second message is msg2 or a random access response message, for example, which is determined by the network-side device based on information about the network-side device and the first message (i.e., the identifier information in the first message).

The second message is used to instruct the UE to transmit uplink data in an uplink scheduling grant-free manner or in an uplink scheduling grant-based manner. Compared with the uplink scheduling grant-based manner, the UE does not need to receive an uplink grant message or transmit uplink data in a granted uplink resource in the uplink scheduling grant-free manner, but may transmit uplink data in uplink resources that are free of grants, which lowers the signaling latency and reduces signaling overheads.

The information about the network-side device may be information about a base station, for example, which includes, but not limited to, an uplink data transmission manner supported by the network-side device, usage of air interface resources, and/or a service bearing property of the network-side device.

Step 103 includes: transmitting uplink data in an uplink data transmission manner corresponding to the second message.

Thus, after receiving the second message and completing uplink synchronization, the UE may transmit the uplink data in a grant-free uplink resource in a case that the second message corresponds to an uplink scheduling grant-free manner, and transmit the uplink data in a granted uplink resource in a case that the second message corresponds to an uplink scheduling grant-based manner.

As the second message is determined based on the user equipment capability and/or property of service information to be transmitted, as well as the uplink data transmission manner supported by the network-side device, the usage of the air interface resources and/or the service bearing property of the network-side device, the uplink data may be transmitted flexibly with high efficiency and stability in an uplink data transmission manner selected based on the second message.

Figure 2:
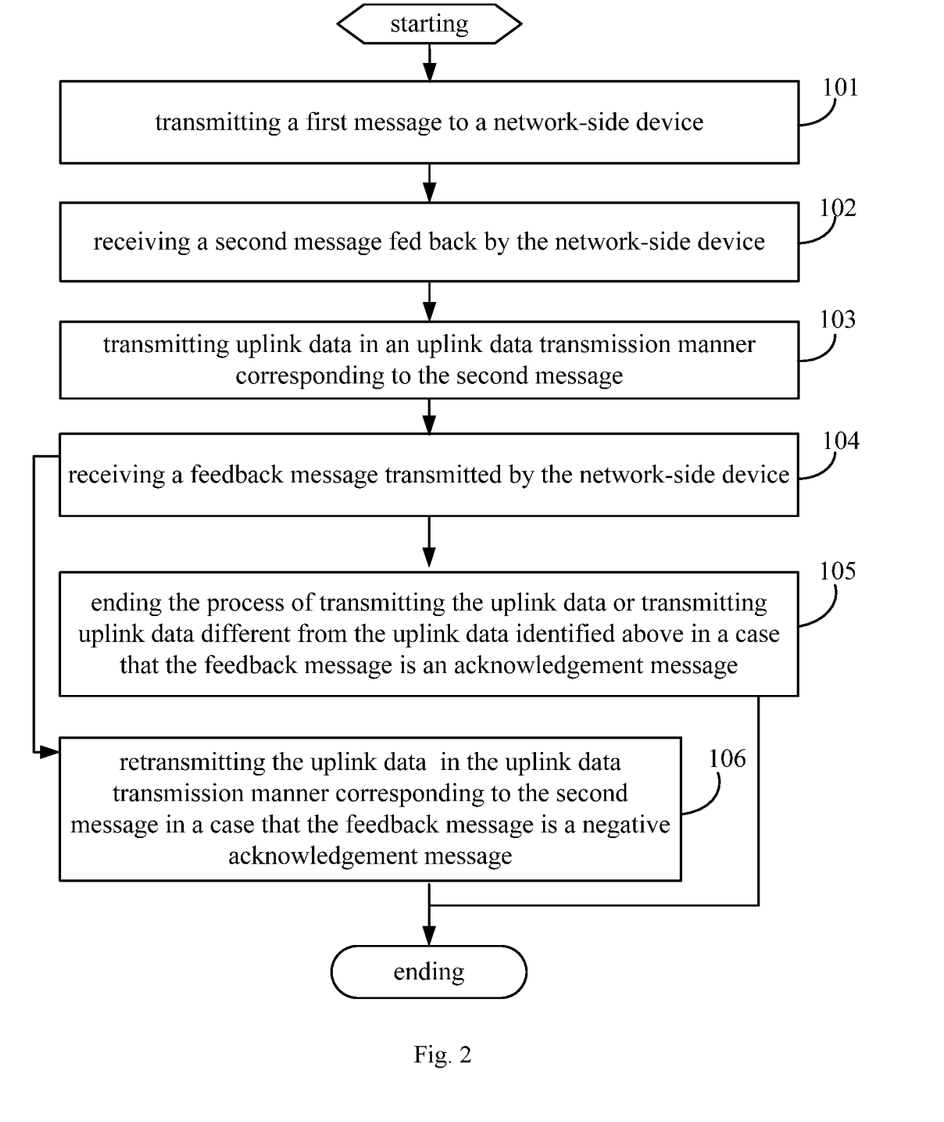
FIG. 2 is a flowchart of a method for transmitting uplink data according to some embodiments of the present disclosure.

In some embodiments of the present disclosure, as shown in FIG. 2, after transmitting the uplink data, the method for transmitting uplink data further includes steps 104 to 106 as described in the following.

Step 104 includes: receiving a feedback message transmitted by the network-side device.

In an embodiment of the present disclosure, when the UE transmits uplink data, the network-side device generally receives the uplink data based on the second message transmitted to the UE, and transmits a feedback message to the UE based on a receiving status of the uplink data.

The feedback message may be an acknowledgement (Acknowledgement, abbreviated as ACK) message or a negative acknowledgement (Negative Acknowledgement, abbreviated as NACK) message. The network-side device transmits an ACK message to the UE in a case of successfully receiving intact uplink data, or transmits a NACK message to the UE in a case of failing to receive intact uplink data.

Step 105 includes: ending the process of transmitting the uplink data or transmitting other uplink data different from the uplink data identified above in a case that the feedback message is an acknowledgement message.

Specifically, in a case of receiving the ACK message, the UE ends the process of transmitting the uplink data or transmits other uplink data different from the uplink data identified above, i.e., other uplink data.

Step 106 includes: retransmitting the uplink data in a case that the feedback message is a negative acknowledgement message.

Specifically, the UE retransmits the uplink data in a case of receiving the NACK message.

In the method for transmitting uplink data according to the embodiments of the present disclosure, the first message is transmitted to a network-side device, the second message fed back by the network-side device is received, where the second message is determined by the network-side device based on information about the network-side device and the first message, and uplink data is transmitted in the uplink data transmission manner corresponding to the second message. In this way, a user equipment can flexibly transmit uplink data in response to an indication from the network-side device without being limited to transmitting the uplink data in an uplink scheduling grant-based manner, thereby achieving the objectives of fulfilling service requirements and transmitting uplink data with high flexibility and stability.

Figure 3:
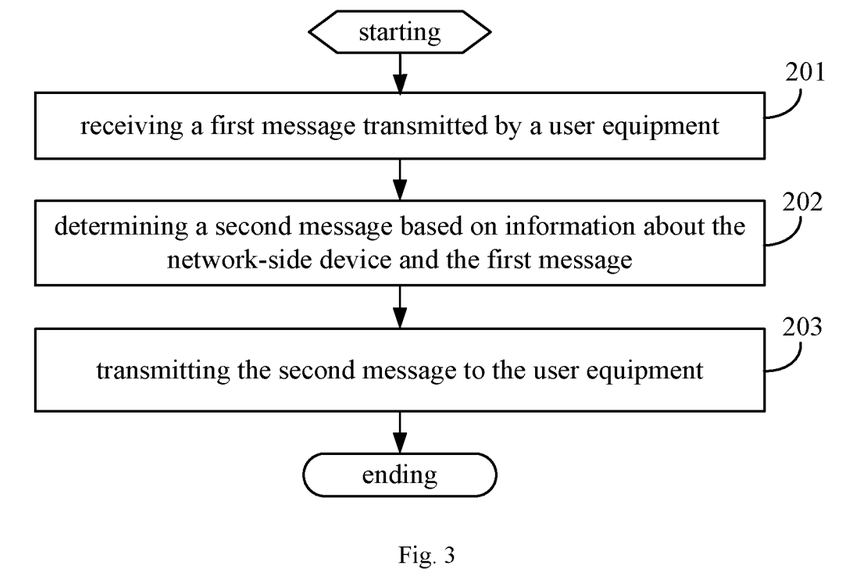
FIG. 3 is a flowchart of a method for transmitting uplink data according to some embodiments of the present disclosure.

With reference to FIG. 3, a method for transmitting uplink data is provided according to some embodiments of the present disclosure, which is applied to a network-side device in a mobile communications system such as 5G, and includes steps 201 to 203 as described in the following.

Step 201 includes: receiving a first message transmitted by a user equipment.

In an embodiment of the present disclosure, the first message may be transmitted to a network-side device, when uplink data arrives at a UE and an uplink data transmission process is to be triggered. The first message is msg1 or a random access request message, for example, which is employed to notify the network-side device of an uplink data transmission manner desired by the UE. The network-side device may be a base station, for example, which is not limited in the present disclosure.

Specifically, the first message may include identifier information, and the identifier information is configured to indicate the uplink data transmission manner desired by the UE. The identifier information may be set by the UE based on a user equipment capability, an uplink data transmission manner supported by the network-side device, and/or service information to be transmitted. The user equipment capability includes, but not limited to, whether the UE supports transmitting uplink data in an uplink scheduling grant-free manner.

Step 202 includes: determining a second message based on information about the network-side device and the first message.

In an embodiment, after receiving the first message transmitted by the UE, the network-side device may feed back a second message to the UE. The second message is msg2 or a random access response message, for example, which is determined by the network-side device based on information about the network-side device and the first message (i.e., the identifier information in the first message).

The second message is used to instruct the UE to transmit uplink data in an uplink scheduling grant-free manner or in an uplink scheduling grant-based manner. Compared with the uplink scheduling grant-based manner, the UE does not need to receive an uplink grant message or transmit uplink data in a granted uplink resource in an uplink scheduling grant-free manner, and may transmit uplink data in a grant-free uplink resource, which reduces the signaling latency and signaling overheads.

The information about the network-side device may be information about a base station, for example, which includes, but not limited to, an uplink data transmission manner supported by the network-side device, usage of air interface resources and/or a service bearing property of the network-side device.

In an embodiment of the present disclosure, the second message may include media access control random access response information MAC RAR, and the MAC RAR is used to indicate an uplink data transmission manner for the UE.

Figure 4A:
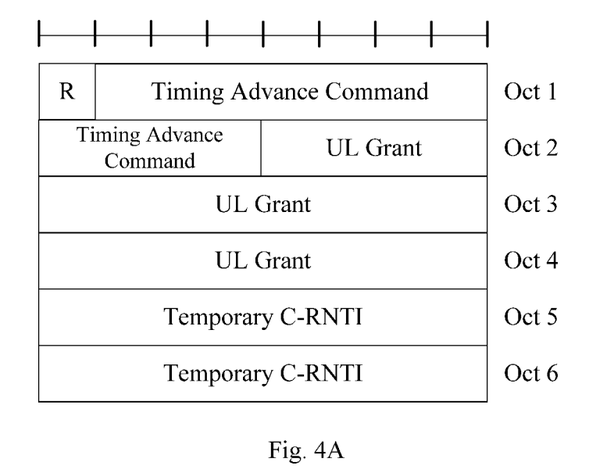
FIG. 4A is a schematic structural diagram of MAC RAR in related art.

Generally, as shown in FIG. 4A, MAC RAR includes four fields, which are R, Timing Advance Command, UL Grant and Temporary C-RNTI. In an embodiment, MAC RAR may be used to indicate the uplink data transmission manner for the UE by re-designing the MAC RAR in related art.

The MAC RAR may be, but not limited to, redesigned in the following manners.

First Manner

Figure 4B:
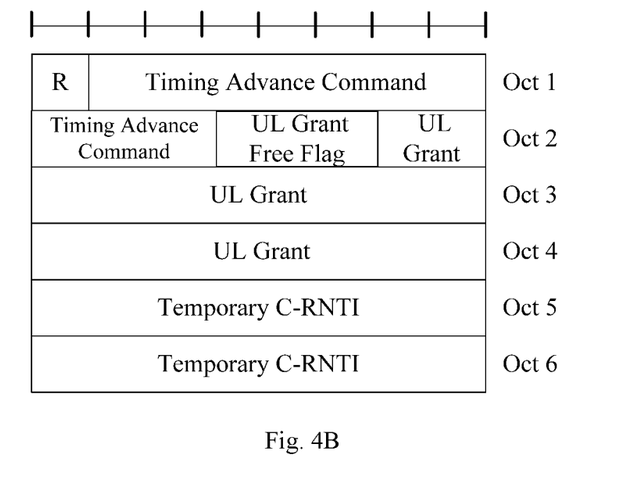
FIG. 4B is a schematic structural diagram of MAC RAR in a first manner according to some embodiments of the present disclosure.

In the first manner, compared with the MAC RAR in related art, the MAC RAR in an embodiment of the present disclosure includes a newly added field, where the newly added field is used to indicate an uplink data transmission manner for the UE.

For example, as shown in FIG. 4B, the newly added field is UL Grant Free Flag, which indicates the uplink data transmission manner for the UE. The UE reads the UL Grant Free Flag in the MAC RAR to obtain the uplink data transmission manner. In a case that it is indicated that uplink data is to be transmitted in an uplink scheduling grant-based manner, the UE reads content of an uplink grant field named UL grant, and transmits the uplink data in a granted uplink resource based on the content of UL grant; and in a case that it is indicated that uplink data is to be transmitted in an uplink scheduling grant-free manner, the UE disregards all or some content of UL grant, and transmits the uplink data in a grant-free uplink resource.

Second Manner

Figure 4C:
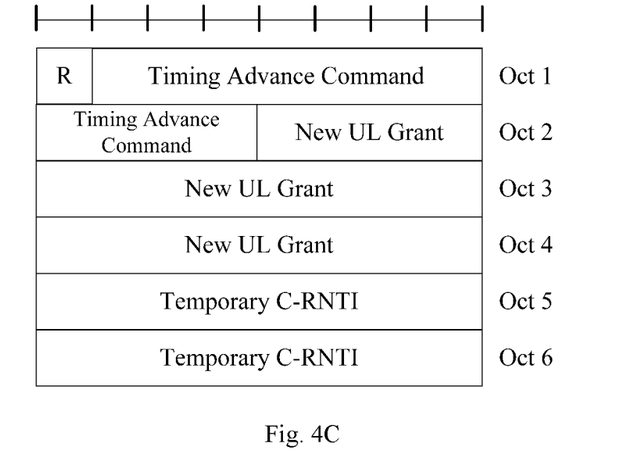
FIG. 4C is a schematic structural diagram of MAC RAR in a second manner according to some embodiments of the present disclosure.

In the second manner, compared with the MAC RAR in related art, the MAC RAR in an embodiment of the present disclosure includes an improved uplink grant field named New UL grant, where New UL grant is used to indicate an uplink data transmission manner for the UE.

For example, as shown in FIG. 4C, UL grant in related art is replaced with New UL grant. The UE reads the New UL grant in the MAC RAR to obtain the uplink data transmission manner, and transmits uplink data as indicated by the New UL grant.

Third Manner

Figure 4D:
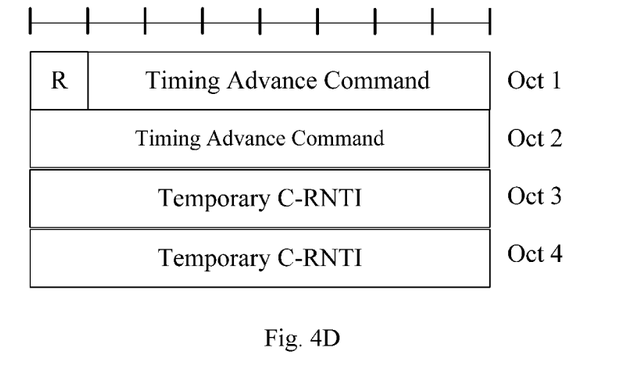
FIG. 4D is a schematic structural diagram of MAC RAR in a third manner according to some embodiments of the present disclosure.

In the third manner, the MAC RAR may include UL grant (which is similar as the MAC RAR in related art in this case), or does not include UL grant. In a case that the MAC RAR includes UL grant, the UE is instructed to transmit uplink data in an uplink scheduling grant-based manner. In a case that the MAC RAR does not include UL grant, the UE is instructed to transmit the uplink data in an uplink scheduling grant-free manner.

For example, as shown in FIGS. 4A and 4D, the MAC RAR in FIG. 4A includes UL grant, and the UE is indicated to transmit uplink data in an uplink scheduling grant-based manner; and the MAC RAR in FIG. 4D does not include UL grant, and the UE is indicated to transmit the uplink data in an uplink scheduling grant-free manner. If the UE reads the MAC RAR in FIG. 4A, the UE may obtain content of UL grant and transmit the uplink data in a granted uplink resource. If the UE reads the MAC RAR in FIG. 4D, the UE may not obtain the content of UL grant and may transmit the uplink data in a grant-free uplink resource.

Step 203 includes: transmitting the second message to the user equipment.

In an embodiment of the present disclosure, the second message is used to indicate the UE to transmit the uplink data in an uplink data transmission manner corresponding to the second message. In this way, after receiving the second message transmitted by the network-side device and completing uplink synchronization, the UE may transmit the uplink data in the uplink data transmission manner corresponding to the second message.

The UE may transmit the uplink data in a grant-free uplink resource in a case that the second message corresponds to an uplink scheduling grant-free manner, and transmit the uplink data in a granted uplink resource in a case that the second message corresponds to an uplink scheduling grant-based manner.

Figure 5:
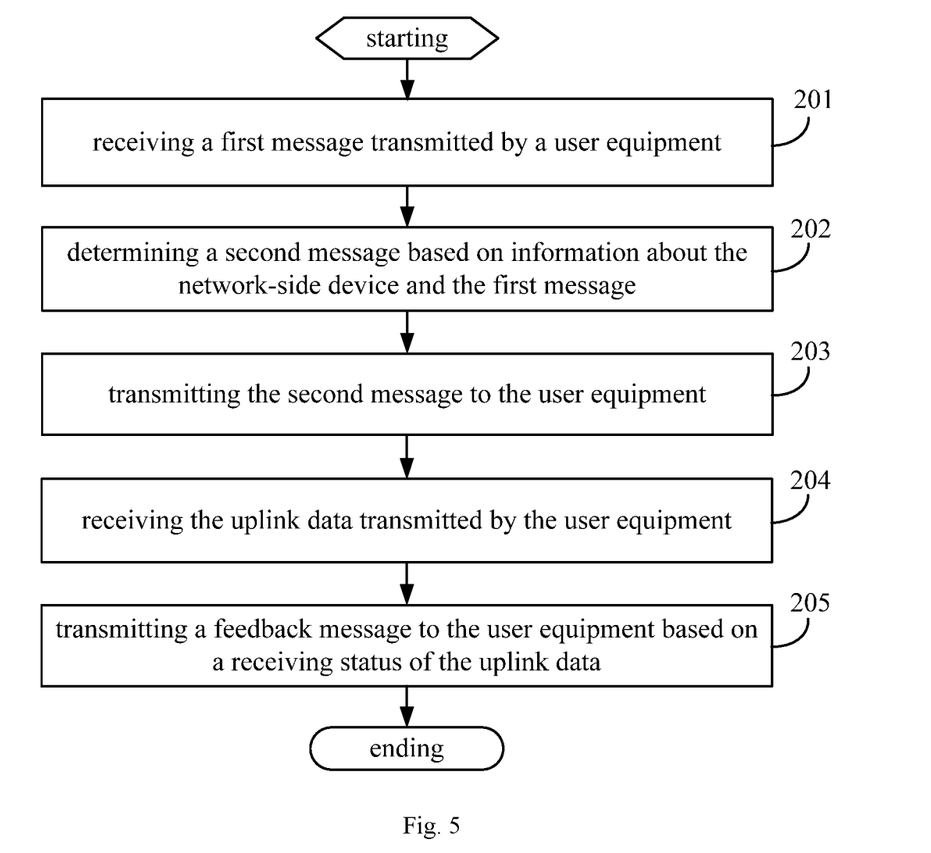
FIG. 5 is a flowchart of a method for transmitting uplink data according to some embodiments of the present disclosure.

In some embodiments of the present disclosure, as shown in FIG. 5, after transmitting the second message to the UE, the method for transmitting uplink data further includes steps 204 and 205 as described in the following.

Step 204 includes: receiving the uplink data transmitted by the user equipment.

In an embodiment of the present disclosure, when the UE transmits uplink data, the network-side device generally receives the uplink data based on the second message transmitted to the UE.

Step 205 includes: transmitting a feedback message to the user equipment based on a receiving status of the uplink data.

In an embodiment of the present disclosure, the feedback message may be an acknowledgement message ACK or a negative acknowledgement message NACK. The network-side device transmits an ACK message to the UE in a case of successfully receiving intact uplink data, to instruct the UE to end the process of transmitting the uplink data or transmit other uplink data that is different from the uplink data, or transmits a NACK message to the UE in a case of failing to receive intact uplink data, to instruct the UE to retransmit the uplink data.

In the method for transmitting uplink data according to the embodiments of the present disclosure, the first message transmitted by the user equipment is received, the second message is determined by the network-side device based on information about the network-side device and the first message, and the second message is fed back to the user equipment, where the second message is used to instruct the user equipment to transmit uplink data in an uplink data transmission manner corresponding to the second message. In this way, the user equipment can flexibly transmit uplink data in response to an indication from the network-side device without being limited to transmitting the uplink data in an uplink scheduling grant-based manner, thereby achieving the objectives of fulfilling service requirements and transmitting uplink data with high flexibility and stability.

Figure 6:
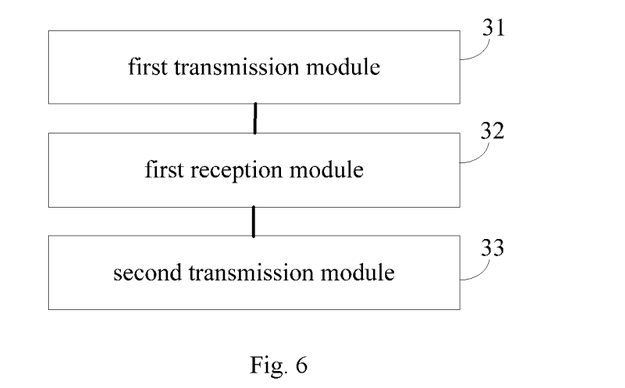
FIG. 6 is a schematic structural diagram of a user equipment according to some embodiments of the present disclosure.

With reference to FIG. 6, a user equipment is provided according to some embodiments of the present disclosure, which corresponds to the method for transmitting uplink data as shown in FIG. 1, may perform the details of the method for transmitting uplink data and achieve the same effects. The user equipment includes a first transmission module 31, a first reception module 32 and a second transmission module 33 as described in the following.

The first transmission module 31 is configured to transmit a first message to a network-side device.

The first reception module 32 is configured to receive a second message fed back by the network-side device, where the second message is determined by the network-side device based on information about the network-side device and the first message.

The second transmission module 33 is configured to transmit uplink data in an uplink data transmission manner corresponding to the second message.

Specifically, the second message is used to indicate the user equipment to transmit uplink data in an uplink scheduling grant-free manner or in an uplink scheduling grant-based manner.

Specifically, the first message includes identifier information, and the identifier information indicates an uplink data transmission manner desired by the user equipment.

Specifically, the identifier information is set by the user equipment based on a user equipment capability, an uplink data transmission manner supported by the network-side device, and/or service information to be transmitted.

Specifically, the user equipment capability includes, but not limited to, whether the user equipment supports transmitting uplink data in an uplink scheduling grant-free manner.

Specifically, the information about the network-side device includes, but not limited to, an uplink data transmission manner supported by the network-side device, usage of air interface resources and/or service bearing property of the network-side device.

The first message may be a random access request message, and the second message may be a random access response message.

Figure 7:
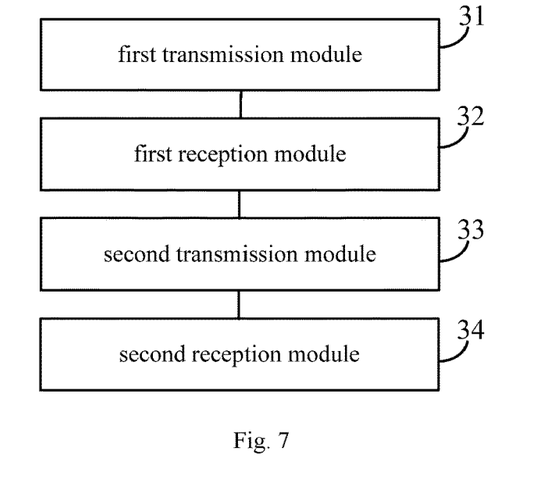
FIG. 7 is a schematic structural diagram of a user equipment according to some embodiments of the present disclosure.

In some embodiments of the present disclosure, as shown in FIG. 7, the user equipment further includes a second reception module 34.

The second reception module 34 is configured to receive a feedback message transmitted by the network-side device.

Accordingly, the second transmission module 33 is further configured to: end the process of transmitting the uplink data or transmit other uplink data different from the uplink data identified above in a case that the feedback message is an acknowledgement message; or to retransmit the uplink data in a case that the feedback message is a negative acknowledgement message.

In the embodiments of the present disclosure, the user equipment transmits the first message to a network-side device, receives the second message fed back by the network-side device, where the second message is determined by the network-side device based on information about the network-side device and the first message, and transmits uplink data in an uplink data transmission manner corresponding to the second message. Thus, the user equipment can flexibly transmit uplink data in response to an indication from the network-side device without being limited to transmitting the uplink data in an uplink scheduling grant-based manner, thereby achieving the objectives of fulfilling service requirements and transmitting uplink data with high flexibility and stability.

Figure 8:
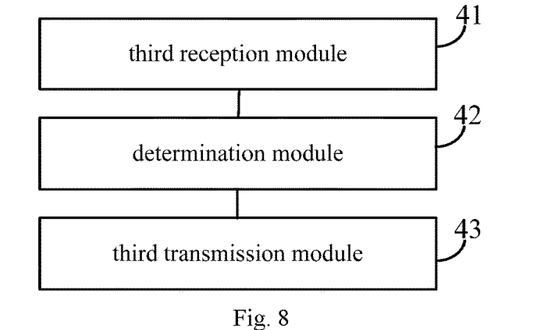
FIG. 8 is a schematic structural diagram of a network-side device according to some embodiments of the present disclosure.

With reference to FIG. 8, a network-side device is provided according to some embodiments of the present disclosure, which corresponds to the method for transmitting uplink data as shown in FIG. 3, and may perform the details of the method for transmitting uplink data and achieve the same effects. The network-side device includes a third reception module 41, a determination module 42 and a third transmission module 43 as described in the following.

The third reception module 41 is configured to receive a first message transmitted by a user equipment.

The determination module 42 is configured to determine a second message based on information about the network-side device and the first message.

The third transmission module 43 is configured to transmit the second message to the user equipment, where the second message is used to indicate the user equipment to transmit uplink data in an uplink data transmission manner corresponding to the second message.

Specifically, the second message is used to indicate the user equipment to transmit uplink data in an uplink scheduling grant-free manner or in an uplink scheduling grant-based manner.

Specifically, the first message includes identifier information, and the identifier information indicates an uplink data transmission manner desired by the user equipment.

Specifically, the identifier information is set by the user equipment based on a user equipment capability, an uplink data transmission manner supported by the network-side device and/or service information to be transmitted.

Specifically, the user equipment capability includes, but not limited to, whether the user equipment supports transmitting uplink data in an uplink scheduling grant-free manner.

Specifically, the information about the network-side device includes, but not limited to, an uplink data transmission manner supported by the network-side device, usage of air interface resources and/or a service bearing property of the network-side device.

In an embodiment of the present disclosure, MAC RAR in the second message is used to indicate an uplink data transmission manner for the user equipment.

Specifically, the MAC RAR may include a newly added field, where the newly added field is used to indicate the uplink data transmission manner for the user equipment. The MAC RAR may include an improved uplink grant field, where the improved uplink grant field is used to indicate the uplink data transmission manner for the user equipment. The MAC RAR may include an uplink grant field or does not include an uplink grant field, where in a case that the MAC RAR includes an uplink grant field, the user equipment is indicated to transmit uplink data in an uplink scheduling grant-based manner, and in a case that the MAC RAR does not include an uplink grant field, the user equipment is indicated to transmit the uplink data in an uplink scheduling grant-free manner.

The first message may be a random access request message, and the second message may be a random access response message.

Figure 9:
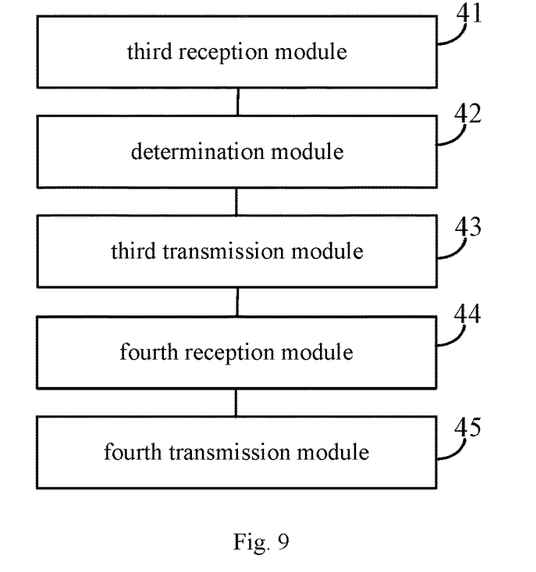
FIG. 9 is a schematic structural diagram of a network-side device according to some embodiments of the present disclosure.

In some embodiments of the present disclosure, as shown in FIG. 9, the network-side device further includes a fourth reception module 44 and a fourth transmission module 45.

The fourth reception module 44 is configured to receive the uplink data transmitted by the user equipment.

The fourth transmission module 45 is configured to transmit a feedback message to the user equipment based on a receiving status of the uplink data. The feedback message is used to indicate the user equipment to, in response to the feedback message, end the process of transmitting the uplink data, transmit other uplink data different from the uplink data identified above or retransmit the uplink data.

In a fourth embodiment according to the present disclosure, the network-side device receives the first message transmitted by the user equipment, determines the second message based on information about the network-side device and the first message, and transmit the second message to the user equipment, where the second message is used to indicate the user equipment to transmit uplink data in an uplink data transmission manner corresponding to the second message. In this way, a user equipment can flexibly transmit uplink data in response to an indication of the network-side device without being limited to transmitting the uplink data in an uplink scheduling grant-based manner, thereby achieving the objectives of fulfilling service requirements and transmitting uplink data with high flexibility and stability.

Figure 10:
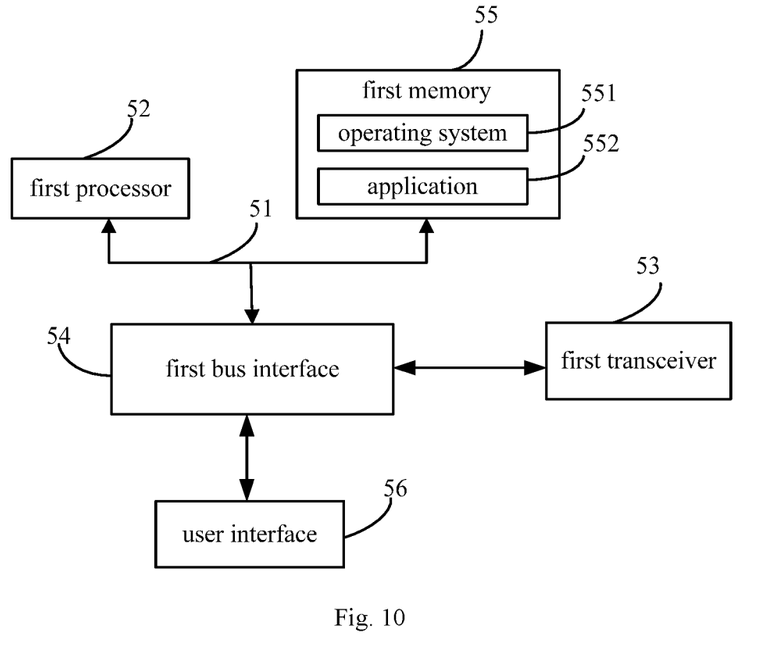
FIG. 10 is a schematic structural diagram of a user equipment according to some embodiments of the present disclosure.

With reference to FIG. 10, a user equipment is provided according to some embodiments of the present disclosure, which includes a first bus 51, a first processor 52, a first transceiver 53, a first bus interface 54, a first memory 55, and a user interface 56.

The first processor 52 is configured to read a program stored in the first memory 55 to perform the following process:

controlling the first transceiver 53 to transmit a first message to a network-side device, receive a second message fed back by the network-side device, where the second message is determined by the network-side device based on information about the network-side device and the first message and transmit uplink data in an uplink data transmission manner corresponding to the second message.

The first transceiver 53 is configured to receive and transmit data under the control of the first processor 52.

Specifically, the second message is used to indicate the user equipment to transmit uplink data in an uplink scheduling grant-free manner or in an uplink scheduling grant-based manner.

Specifically, the first message includes identifier information, and the identifier information indicates an uplink data transmission manner desired by the user equipment.

Specifically, the identifier information is set by the user equipment based on a user equipment capability, an uplink data transmission manner supported by the network-side device, and/or service information to be transmitted.

Specifically, the user equipment capability includes whether the user equipment supports transmitting uplink data in an uplink scheduling grant-free manner.

Specifically, the information about the network-side device includes an uplink data transmission manner supported by the network-side device, usage of air interface resources, and/or a service bearing property of the network-side device.

Specifically, the first message may be a random access request message, and the second message may be a random access response message.

Specifically, the first processor 52 is further configured to: control the first transceiver 53 to receive a feedback message transmitted by the network-side device, and end the process of transmitting the uplink data or transmit other uplink data different from the uplink data identified above in a case that the feedback message is an acknowledgement message, or to retransmit the uplink data in a case that the feedback message is a negative acknowledgement message.

In FIG. 10, a bus architecture is represented by the first bus 51. The first bus 51 may include any number of interconnected buses and bridges, which links various circuits such as one or multiple processors represented by the first processor 52, and memories represented by the first memory 55. The first bus 51 may also link other circuit components such as an external device, a voltage stabilizer and a power management circuit, which is common knowledge in the art and therefore is not described in further detail in the present disclosure. The first bus interface 54 provides an interface between the first bus 51 and the first transceiver 53. The first transceiver 53 may be implemented in form of one or more components, for example, multiple receivers and transmitters, which provides units for communication with other apparatuses on a transmission medium. For example, the first transceiver 53 receives external data from other devices. The first transceiver 53 is configured to transmit data processed by the first processor 52 to other devices. A user interface 56, such as a key pad, a display, a loudspeaker, a microphone and a joystick, may be further provided depending on properties of a computation system.

The first processor 52 is responsible for management of the first bus 51 and general processing, for example, running a general-purpose operating system, and the first memory 55 may be configured to store the data used by the first processor 52 in performing operations.

Optionally, the first processor 52 may be a CPU, an ASIC, an FPGA or a CPLD.

It is understandable that the first memory 55 according to the embodiments of the present disclosure may be a volatile memory or a non-volatile memory, or include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (Random Access Memory, RAM) that acts as an external high-speed cache. By way of example but not limitation, many types of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM) and direct rambus random access memory (Direct Rambus RAM, DRRAM). The first memory 55 used in the systems and methods described in the present disclosure is intended to include, but not limited to, these types listed above and any other suitable types of memory.

In some embodiments, a first memory 55 stores the following elements: executable modules or data structures, or subsets of the executable modules or data structures, or extension sets of the executable modules or data structures such as an operating system 551 and an application 552.

The operating system 551 includes a variety of system programs, such as a framework layer, a core library layer and a driver layer, for implementing various basis services and processing hardware-based tasks. The application 552 includes various applications, such as a media player (Media Player) and a browser (Browser), for implementing various application services. The program for implementing the method according to the embodiments of the present disclosure may be included in the application 552.

In the embodiments of the present disclosure, the user equipment controls the first transceiver 53 to transmit a first message to a network-side device, receive a second message fed back by the network-side device, where the second message is determined by the network-side device based on information about the network-side device and the first message, and transmit uplink data in an uplink data transmission manner corresponding to the second message. Thus, the user equipment can flexibly transmit uplink data in response to an indication of the network-side device without being limited to transmitting the uplink data in an uplink scheduling grant-based manner, thereby achieving the objectives of fulfilling service requirements and transmitting uplink data with high flexibility and stability.

Figure 11:
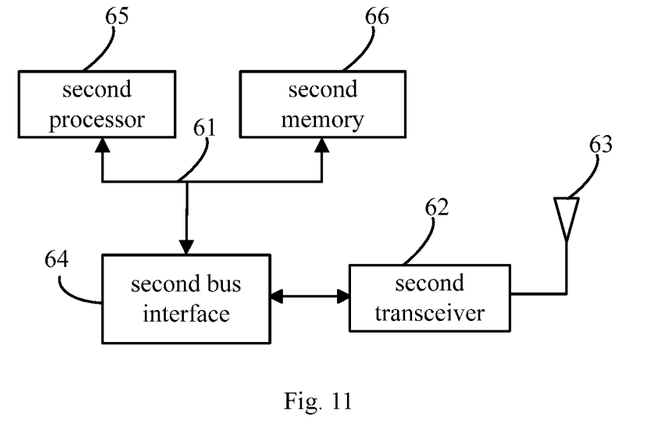
FIG. 11 is a schematic structural diagram of a network-side device according to some embodiments of the present disclosure.

With reference to FIG. 11, a network-side device is provided according to some embodiments of the present disclosure, which includes a second bus 61, a second transceiver 62, an antenna 63, a second bus interface 64, a second processor 65 and a second memory 66.

The second processor 65 is configured to read a program stored in the second memory 66 to perform the following process:

controlling the second transceiver 62 to receive a first message transmitted by a user equipment and determine a second message based on information about the network-side device and the first message, and controlling the second transceiver 62 to transmit the second message to the user equipment, where the second message is used to indicate the user equipment to transmit uplink data in an uplink data transmission manner corresponding to the second message.

The second transceiver 62 is configured to receive and transmit data under the control of the second processor 65.

Specifically, the second message is used to indicate the user equipment to transmit uplink data in an uplink scheduling grant-free manner or in an uplink scheduling grant-based manner.

Specifically, the first message includes identifier information, and the identifier information indicates an uplink data transmission manner desired by the user equipment.

Specifically, the identifier information is set by the user equipment based on a user equipment capability, an uplink data transmission manner supported by the network-side device and/or service information to be transmitted.

Specifically, the user equipment capability includes whether the user equipment supports transmitting uplink data in an uplink scheduling grant-free manner.

Specifically, the information about the network-side device includes an uplink data transmission manner supported by the network-side device, usage of air interface resources and/or a service bearing property of the network-side device.

In an embodiment of the present disclosure, MAC RAR in the second message is used to indicate an uplink data transmission manner for the user equipment. The MAC RAR may include a newly added field, where the newly added field is used to indicate the uplink data transmission manner for the user equipment. The MAC RAR may include an improved uplink grant field, where the improved uplink grant field is used to indicate the uplink data transmission manner for the user equipment. The MAC RAR may include an uplink grant field or does not include an uplink grant field, where in a case that the MAC RAR includes an uplink grant field, the user equipment is indicated to transmit uplink data in an uplink scheduling grant-based manner, and in a case that the MAC RAR does not include an uplink grant field, the user equipment is indicated to transmit the uplink data in an uplink scheduling grant-free manner.

In an embodiment, the first message may be a random access request message and the second message may be a random access response message.

In an embodiment, the second processor 65 is further configured to: control the second transceiver 62 to receive uplink data transmitted by the user equipment and to transmit a feedback message to the user equipment based on a receiving status of the uplink data. The feedback message is used to indicate the user equipment to, in response to the feedback message, end the process of transmitting the uplink data, transmit other uplink data different from the uplink data identified above or retransmit the uplink data.

In FIG. 11, a bus architecture is represented by the second bus 61. The second bus 61 may include any number of interconnected buses and bridges, which links various circuits such as one or multiple processors represented by the second processor 65 and memories represented by second memory 66. The second bus 61 may also link other circuit components such as an external device, a voltage stabilizer and a power management circuit, which is common knowledge in the art and therefore is not described in further detail in the present disclosure. The second bus interface 64 provides an interface between the second bus 61 and the second transceiver 62. The second transceiver 62 may be implemented in the form of one or more components, for example, multiple receivers and transmitters, which provides units for communication with other apparatuses on a transmission medium. Data processed by the second processor 65 is transmitted by the antenna 63 via a wireless medium, and further, the antenna 63 also receives data and transmits the received data to the second processor 65.

The second processor 65 is responsible for management of the second bus 61 and general processing, and may also provide various functions such as timing, peripheral interfaces, voltage regulation, power management and other control functions. The second memory 66 may be configured to store the data used by the second processor 65 in performing operations.

Optionally, the second processor 64 may be a CPU, an ASIC, an FPGA or a CPLD.

In the embodiments according to the present disclosure, the network-side device controls the second transceiver 62 to receive a first message transmitted by a user equipment, determine a second message based on information about the network-side device and the first message, and transmit the second message to the user equipment, where the second message is used to indicate the user equipment to transmit uplink data in an uplink data transmission manner corresponding to the second message. In this way, a user equipment may flexibly transmit uplink data in response to an indication of the network-side device without being limited to transmitting the uplink data in an uplink scheduling grant-based manner, thereby achieving the objectives of fulfilling service requirements and transmitting uplink data with high flexibility and stability.

It should be noted that the term "include", "comprise", or any other variant thereof, is intended to encompass a non-exclusive inclusion, such that a process, method, item, or device including a series of elements not only includes those elements, but also includes other elements that are not explicitly listed or elements that are inherent to such a process, method, item, or device. An element that is preceded by the phrase "comprising a . . . " does not exclude the presence of additional same elements in the process, method, item, or device that comprises the element.

The above-mentioned serial numbers of the embodiments of the present disclosure are merely for purpose of description, rather than representing rank of merits of the embodiments.

Through the description of the above embodiments, those skilled in the art can clearly understand that the foregoing embodiment method can be implemented by means of software plus a necessary general hardware platform, and in practice, can also be implemented through hardware, where, notwithstanding, the former is better in many cases. Based on such understanding, the essence or the part contributing to related art of the technical solutions of the present disclosure may be embodied in the form of a software product, where the computer software product is stored in a storage medium (such as a ROM/RAM, a disk and a CD-ROM) and includes a number of instructions for enabling a terminal device (which may be a cell phone, a computer, a server, an air conditioner, or a network device, etc.) to perform the methods described in various embodiments of the present disclosure.

The above-described are merely some specific embodiments of the present disclosure, which do not limit the scope of the present disclosure. Numerous modifications or substitutions may be easily made by one of ordinary skill in the art within the technical scope of the present disclosure, and these modifications and substitutions shall also fall within the scope of the present disclosure. Therefore, the scope of the present disclosure is defined by the appended set of claims.

What is claimed is:

1. A method for transmitting uplink data, comprising:
transmitting a first message to a network-side device;
receiving a second message fed back by the network-side device, wherein the second message is determined by the network-side device based on information about the network-side device and the first message; and
transmitting the uplink data in an uplink data transmission manner corresponding to the second message,
wherein the first message comprises identifier information, and the identifier information is configured to indicate an uplink data transmission manner desired by a user equipment;
wherein the identifier information is set by the user equipment based on at least one of a user equipment capability, an uplink data transmission manner supported by the network-side device, or service information to be transmitted; and
wherein the user equipment capability comprises whether the user equipment supports transmitting uplink data in an uplink scheduling grant-free manner.

2. The method according to claim 1, wherein the second message is configured to indicate the user equipment to transmit the uplink data in an uplink scheduling grant-free manner, or indicate the user equipment to transmit the uplink data in an uplink scheduling grant-based manner.

3. The method according to claim 1, wherein the first message is a random access request message, and the second message is a random access response message.

4. The method according to claim 1, wherein after transmitting uplink data in the uplink data transmission manner corresponding to the second message, the method further comprises:
receiving a feedback message transmitted by the network-side device; and
ending the process of transmitting the uplink data, or transmitting other uplink data different from the uplink data, in a case that the feedback message is an acknowledgement message; or retransmitting the uplink data, in a case that the feedback message is a negative acknowledgement message.

5. A method for transmitting uplink data, comprising:
receiving a first message transmitted by a user equipment;
determining a second message based on information about a network-side device and the first message; and
transmitting the second message to the user equipment, wherein the second message is configured to indicate the user equipment to transmit uplink data in an uplink data transmission manner corresponding to the second message,
wherein the first message comprises identifier information, and the identifier information is configured to indicate an uplink data transmission manner desired by the user equipment;
wherein the identifier information is set by the user equipment based on at least one of a user equipment capability, an uplink data transmission manner supported by the network-side device, or service information to be transmitted; and
wherein the user equipment capability comprises whether the user equipment supports transmitting uplink data in an uplink scheduling grant-free manner.

6. The method according to claim 5, wherein the second message is configured to indicate the user equipment to transmit the uplink data in an uplink scheduling grant-free manner, or indicate the user equipment to transmit the uplink data in an uplink scheduling grant-based manner.

7. The method according to claim 5, wherein media access control random access response information MAC RAR in the second message is configured to indicate the uplink data transmission manner for the user equipment, and the MAC RAR is designed in one of the following three manners:
in a first manner, the MAC RAR comprises a newly added field, and the newly added field is configured to indicate the uplink data transmission manner for the user equipment;
in a second manner, the MAC RAR comprises an improved uplink grant field, and the improved uplink grant field is configured to indicate the uplink data transmission manner for the user equipment; and
in a third manner, the MAC RAR comprises an uplink grant field or comprises no uplink grant field, the user equipment is indicated to transmit the uplink data in an uplink scheduling grant-based manner in a case that the MAC RAR comprises the uplink grant field, and the user equipment is indicated to transmit the uplink data in an uplink scheduling grant-free manner in a case that the MAC RAR comprises no uplink grant field.

8. The method according to claim 5, wherein the first message is a random access request message, and the second message is a random access response message; or
wherein after transmitting the second message to the user equipment, the method further comprises:
receiving the uplink data transmitted by the user equipment; and
transmitting a feedback message to the user equipment based on a receiving status of the uplink data, wherein the feedback message is configured to indicate the user equipment to, in response to the feedback message, end the process of transmitting the uplink data, transmit other uplink data different from the uplink data, or retransmit the uplink data in the uplink data transmission manner indicated by the second message.

9. A network-side device, configured to perform the method according to claim 5, comprising:
a second processor, a second transceiver, and a second memory stored with a computer program that is executable by the second processor,
wherein the second transceiver is configured to: under control of the second processor, receive the first message transmitted by the user equipment;
wherein when executing the computer program, the second processor is configured to determine the second message based on information about the network-side device and the first message; and
wherein the second transceiver is configured to: under control of the second processor, transmit the second message to the user equipment, wherein the second message is configured to indicate the user equipment to transmit uplink data in the uplink data transmission manner corresponding to the second message.

10. The network-side device according to claim 9, wherein the second message is configured to indicate the user equipment to transmit the uplink data in an uplink scheduling grant-free manner, or indicate the user equipment to transmit the uplink data in an uplink scheduling grant-based manner.

11. The network-side device according to claim 9, wherein MAC RAR in the second message is configured to indicate the uplink data transmission manner for the user equipment, and the MAC RAR is designed in one of the following three manners:
   in a first manner, the MAC RAR comprises a newly added field, and the newly added field is configured to indicate the uplink data transmission manner for the user equipment;
   in a second manner, the MAC RAR comprises an improved uplink grant field, and the improved uplink grant field is configured to indicate the uplink data transmission manner for the user equipment; and
   in a third manner, the MAC RAR comprises an uplink grant field or comprises no uplink grant field, the user equipment is indicated to transmit the uplink data in an uplink scheduling grant-based manner in a case that the MAC RAR comprises the uplink grant field, and the user equipment is indicated to transmit the uplink data in an uplink scheduling grant-free manner in a case that the MAC RAR comprises no uplink grant field.

12. The network-side device according to claim 9, wherein the first message is a random access request message, and the second message is a random access response message; or
   wherein the second transceiver is configured to: under control of the second processor, receive the uplink data transmitted by the user equipment; and
   transmit a feedback message to the user equipment based on a receiving status of the uplink data, wherein the feedback message is configured to indicate the user equipment to, in response to the feedback message, end transmitting the uplink data, transmit other uplink data different from the uplink data, or retransmit the uplink data in the uplink data transmission manner indicated by the second message.

13. A user equipment, comprising:
   a first processor, a first transceiver, a first memory stored with a computer program that is executable by the first processor,
   wherein the first transceiver is configured to: under control of the first processor, transmit a first message to a network-side device;
   receive a second message fed back by the network-side device, wherein the second message is determined by the network-side device based on information about the network-side device and the first message; and
   transmit uplink data in an uplink data transmission manner corresponding to the second message,
   wherein the first message comprises identifier information, and the identifier information is configured to indicate an uplink data transmission manner desired by a user equipment;
   wherein the identifier information is set by the user equipment based on at least one of a user equipment capability, an uplink data transmission manner supported by the network-side device, or service information to be transmitted; and
   wherein the user equipment capability comprises whether the user equipment supports transmitting uplink data in an uplink scheduling grant-free manner.

14. The user equipment according to claim 13, wherein the second message is configured to indicate the user equipment to transmit the uplink data in an uplink scheduling grant-free manner, or indicate the user equipment to transmit the uplink data in an uplink scheduling grant-based manner.

15. The user equipment according to claim 13, wherein the first message is a random access request message, and the second message is a random access response message.

16. The user equipment according to claim 13, wherein the first transceiver is further configured to: under control of the first processor, receive a feedback message transmitted by the network-side device; and end the process of transmitting the uplink data or transmit other uplink data different from the uplink data in a case that the feedback message is an acknowledgement message; or to retransmit the uplink data in the uplink data transmission manner indicated by the second message in a case that the feedback message is a negative acknowledgement message.

* * * * *